(12) United States Patent
Kuespert

(10) Patent No.: US 11,500,121 B1
(45) Date of Patent: Nov. 15, 2022

(54) GAMMA RAY LOGGING TOOL ASSEMBLY

(71) Applicant: ROCK VISUALIZATION TECHNOLOGY, LLC, Oklahoma City, OK (US)

(72) Inventor: Jonathan Godard Kuespert, Oklahoma City, OK (US)

(73) Assignee: Rock Visualization Technology, LLC, Oklahoma City, OK (US)

( * ) Notice: Subject to any disclaimer, the term of this patent is extended or adjusted under 35 U.S.C. 154(b) by 7 days.

(21) Appl. No.: 17/388,909

(22) Filed: Jul. 29, 2021

(51) Int. Cl.
G01V 5/12 (2006.01)
G01T 1/202 (2006.01)

(52) U.S. Cl.
CPC .............. *G01V 5/12* (2013.01); *G01T 1/2026* (2013.01)

(58) Field of Classification Search
CPC ................................ G01T 1/2026; G01V 5/12
See application file for complete search history.

(56) References Cited

U.S. PATENT DOCUMENTS

| | | | |
|---|---|---|---|
| 2,316,361 A | 4/1943 | Piety | |
| 2,464,930 A | 3/1949 | Herzog | |
| 2,725,486 A | 11/1955 | Walstrom | |
| 2,967,933 A | 1/1961 | Scherbatskoy | |
| 4,286,217 A | 8/1981 | Planche et al. | |
| 4,297,575 A | 10/1981 | Smith, Jr. et al. | |
| 4,471,435 A | 9/1984 | Meisner | |
| 4,503,328 A | 3/1985 | Neufeld | |
| 4,585,939 A | 4/1986 | Arnold et al. | |
| 4,587,423 A | 5/1986 | Boyce | |
| 5,021,652 A | 6/1991 | Arnold | |
| 5,619,411 A | 4/1997 | Smith | |
| 6,026,911 A | 2/2000 | Angle et al. | |
| 6,088,294 A | 7/2000 | Leggett, III et al. | |

(Continued)

FOREIGN PATENT DOCUMENTS

| | | |
|---|---|---|
| EP | 0443936 A1 | 8/1991 |
| WO | 2015051287 A1 | 4/2015 |
| WO | 2016100755 A1 | 6/2016 |

OTHER PUBLICATIONS

EILOG Express and Imaging Logging System, China Petroleum Technology & Development Corporation, downloaded from the Internet at http://www.cptdc.com:8080/cptdc/do/cptdc-2000_2030-0-01-0102-21366-3000_1010-.html, Jun. 29, 2016.

(Continued)

*Primary Examiner* — Blake C Riddick
(74) *Attorney, Agent, or Firm* — McAfee & Taft

(57) ABSTRACT

A well image logging tool assembly comprising at least one sensor unit, at least one spatial positioning device, and a cylindrical outer sheath that extends around and contains the sensor unit and the spatial positioning device. The sensor unit includes a solid cylindrical sensor body formed of a gamma ray shielding material and including at least one longitudinal sensor cavity extending through at least one of the top end and the bottom end of the sensor body. A window corresponds to each sensor cavity and extends through the sensor body from the outside surface thereof to the corresponding sensor cavity. A sensor assembly is disposed in each sensor cavity. Each sensor assembly includes a gamma ray radiation sensor and associated photomultiplier tube.

45 Claims, 12 Drawing Sheets

(56) References Cited

U.S. PATENT DOCUMENTS

| | | |
|---|---|---|
| 6,236,698 B1 | 5/2001 | Hirukawa et al. |
| 6,297,639 B1 | 10/2001 | Clark et al. |
| 6,467,341 B1 | 10/2002 | Boucher et al. |
| 6,766,855 B2 | 7/2004 | Snoga |
| 6,997,257 B2 | 2/2006 | Snoga |
| 7,000,700 B2 | 2/2006 | Cairns et al. |
| 7,081,616 B2 | 7/2006 | Grau et al. |
| 7,133,779 B2 | 11/2006 | Tilke et al. |
| 7,254,486 B2 | 8/2007 | Guo |
| 7,292,942 B2 | 11/2007 | Ellis et al. |
| 7,414,405 B2 | 8/2008 | Moore |
| 7,436,185 B2 | 10/2008 | Fredette et al. |
| 7,763,845 B2 | 7/2010 | Estes et al. |
| 8,201,625 B2 | 6/2012 | Almaguer |
| 8,648,309 B2 | 2/2014 | Smith, Jr. et al. |
| 2001/0041963 A1 | 11/2001 | Estes et al. |
| 2003/0085707 A1 | 5/2003 | Minerbo et al. |
| 2003/0106993 A1* | 6/2003 | Chen ........................ G01V 5/12 250/269.1 |
| 2004/0020647 A1 | 2/2004 | Snoga |
| 2005/0199794 A1 | 9/2005 | Mickael |
| 2006/0149477 A1 | 7/2006 | Cairns et al. |
| 2007/0144740 A1 | 6/2007 | Guo et al. |
| 2009/0256080 A1 | 10/2009 | DeVito |
| 2010/0124313 A1* | 5/2010 | Fujisawa .............. G01N 23/223 378/45 |
| 2010/0314535 A1 | 12/2010 | Zhang et al. |
| 2012/0186061 A1 | 7/2012 | Simonetti et al. |
| 2013/0261974 A1 | 10/2013 | Stewart et al. |
| 2014/0034821 A1 | 2/2014 | Evans et al. |
| 2014/0374582 A1 | 12/2014 | Guo et al. |
| 2015/0055748 A1* | 2/2015 | Simon ..................... G01V 5/12 378/111 |
| 2016/0032717 A1 | 2/2016 | Parker |
| 2016/0123137 A1 | 5/2016 | Liu et al. |
| 2018/0164468 A1* | 6/2018 | Kuespert .................. G01T 1/20 |
| 2018/0164469 A1* | 6/2018 | Kuespert .................. G01V 5/04 |
| 2019/0106984 A1* | 4/2019 | Lee ........................ E21B 47/117 |
| 2019/0204470 A1* | 7/2019 | Kuespert .................. G01V 5/04 |
| 2019/0227189 A1* | 7/2019 | Lentz ...................... G01V 5/12 |
| 2019/0284925 A1* | 9/2019 | Daly ..................... E21B 47/017 |
| 2020/0225380 A1* | 7/2020 | Kuespert .................. G01T 1/20 |
| 2021/0208303 A1* | 7/2021 | Jurczyk ................. G01V 5/101 |
| 2022/0043178 A1 | 2/2022 | Knizhnik et al. |

OTHER PUBLICATIONS

Prosser, Jeremy et al., Eady Dipmeters and New Tricks With Old Dips—Part 1, Task Geoscience, Aug. 17, 2011.

Borehole Imaging, http://petrowiki.org/Borehole_imaging, Jun. 8, 2016.

International Search Report and Written Opinion dated Feb. 14, 2018 in PCT/US17/66203, Jonathan Godard Kuespert.

International Search Report and Written Opinion dated Mar. 1, 2018 in PCT/US17/66156, Jonathan Godard Kuespert.

European Search Report issued in European Patent Application No. 17881838.1 dated Jun. 17, 2020.

Fayer, M.J., et al., "Re-Evaluation of a Subsurface Injection Experiment for Testing Flow and Transport Models" XP55703146, published Feb. 1, 1995.

European Search Report issued in European Patent Application No. 17880266.6 dated Jun. 19, 2020.

International Search Report and Written Opinion issued in corresponding PCT application No. PCT/US2022/030729 dated Sep. 2, 2022.

* cited by examiner

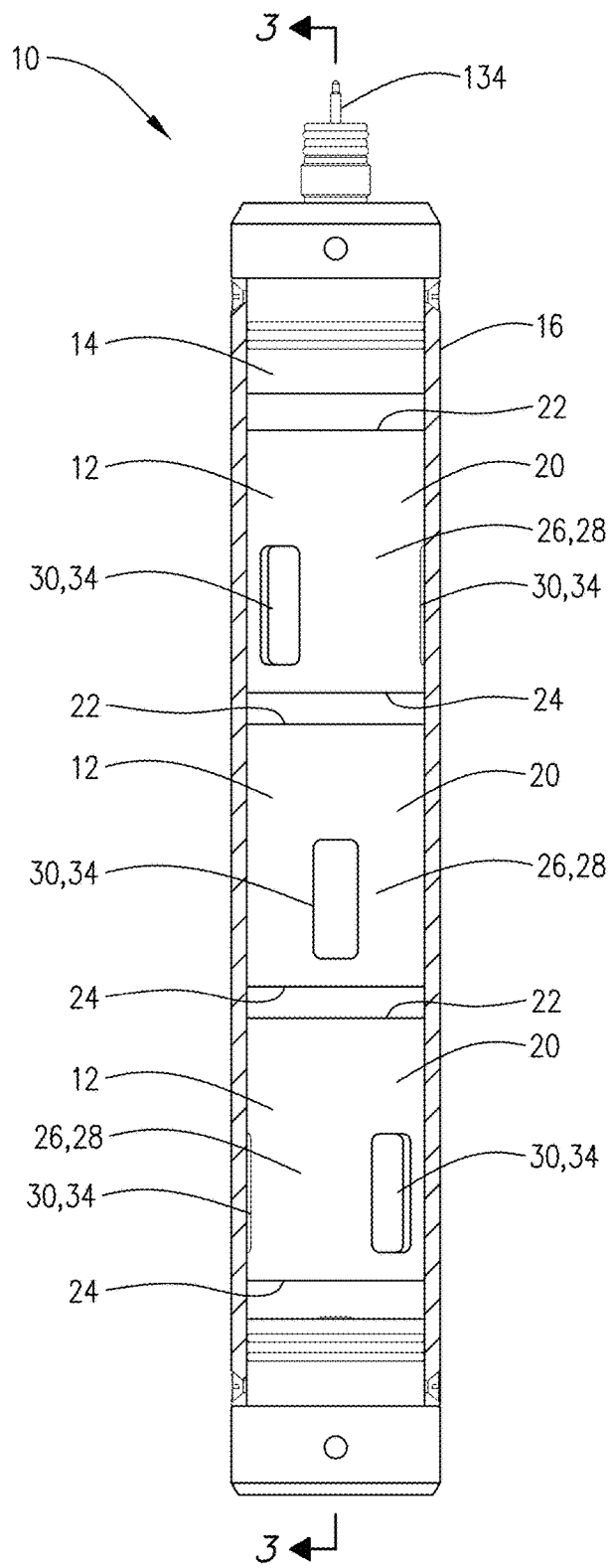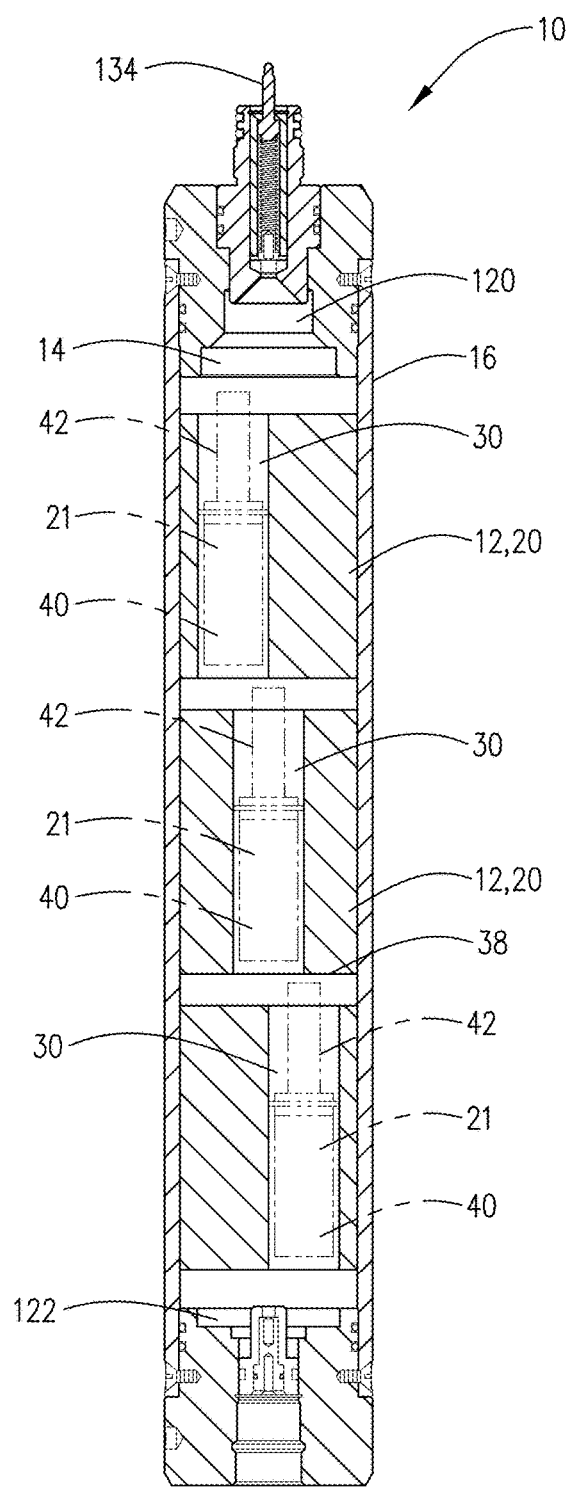
FIG. 2
FIG. 3

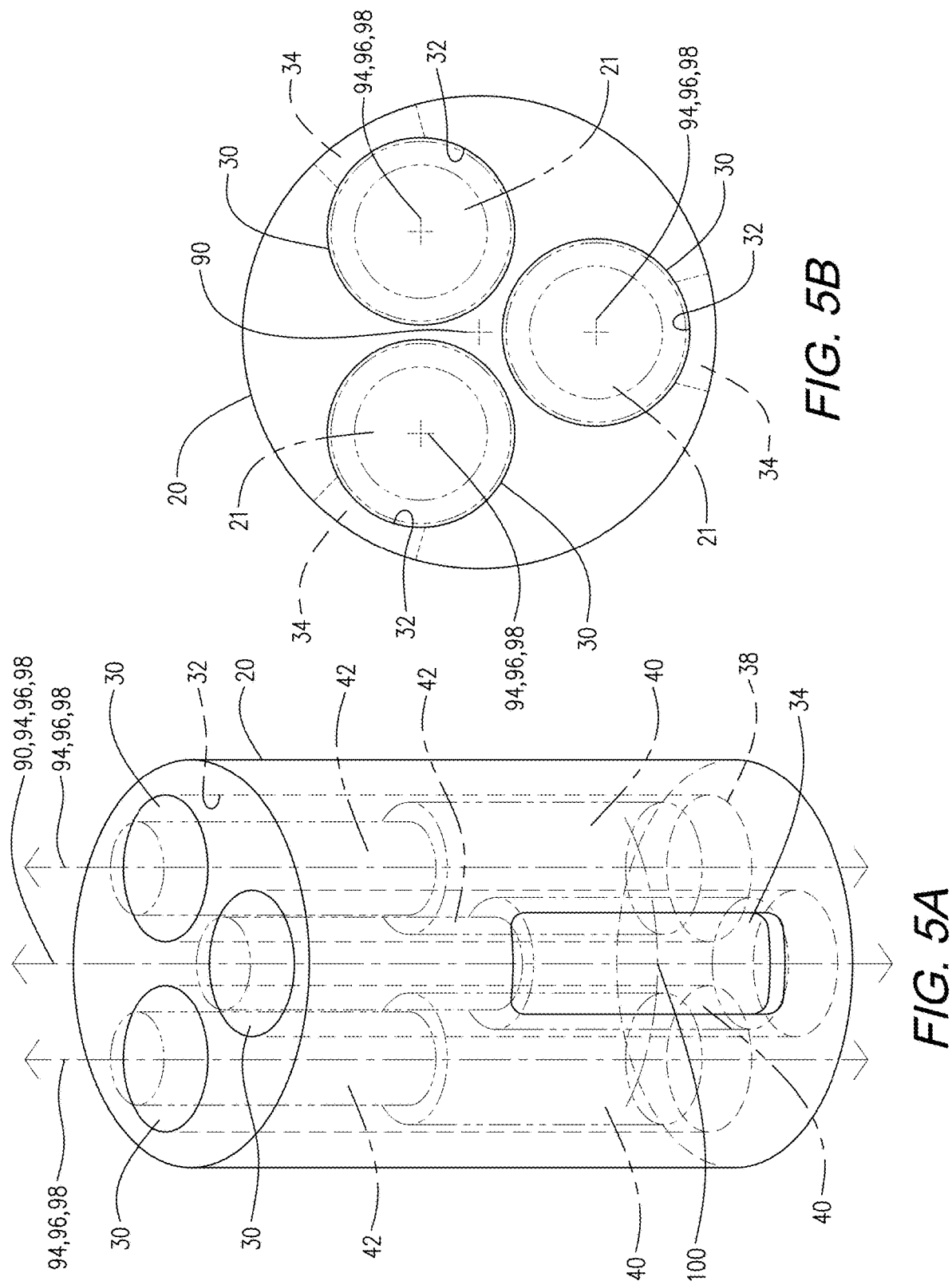

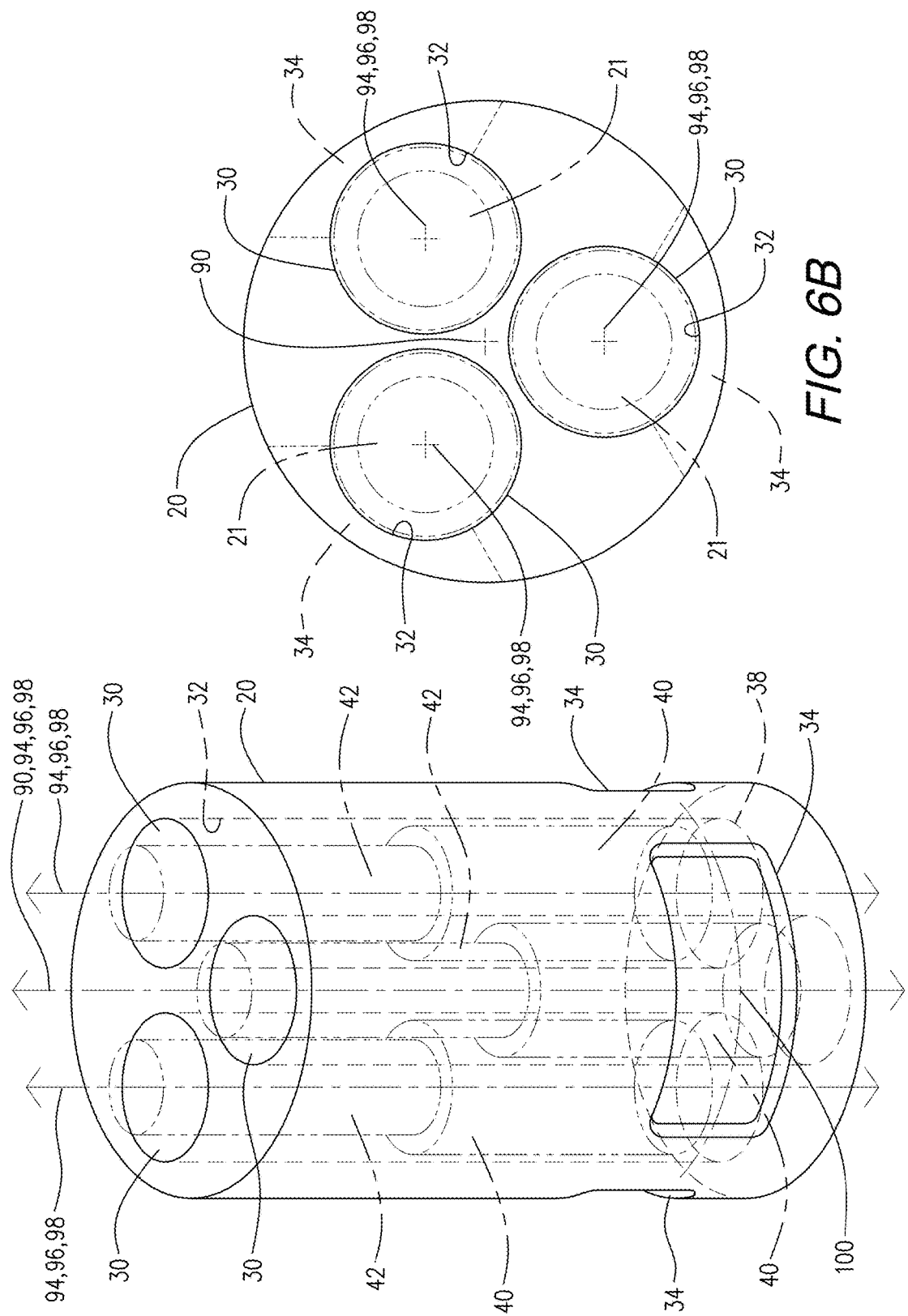

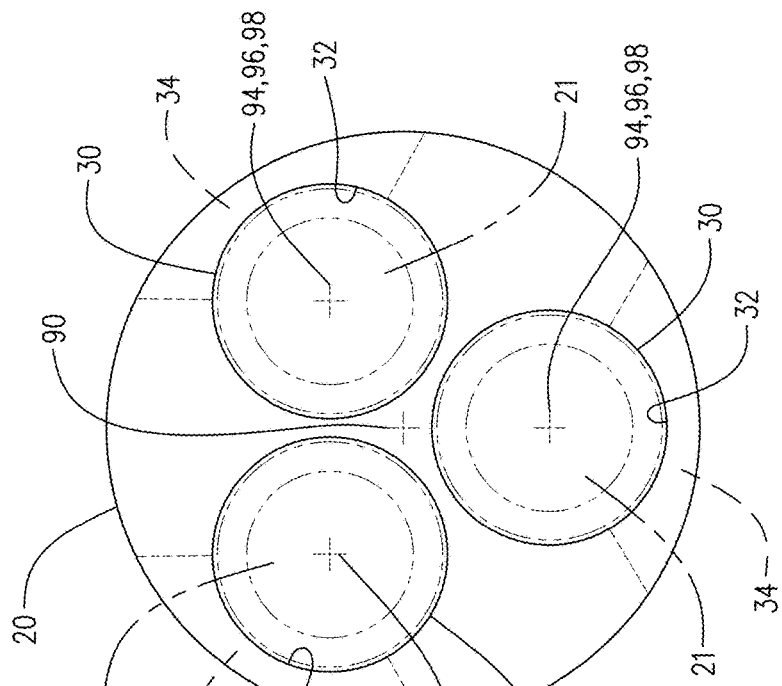
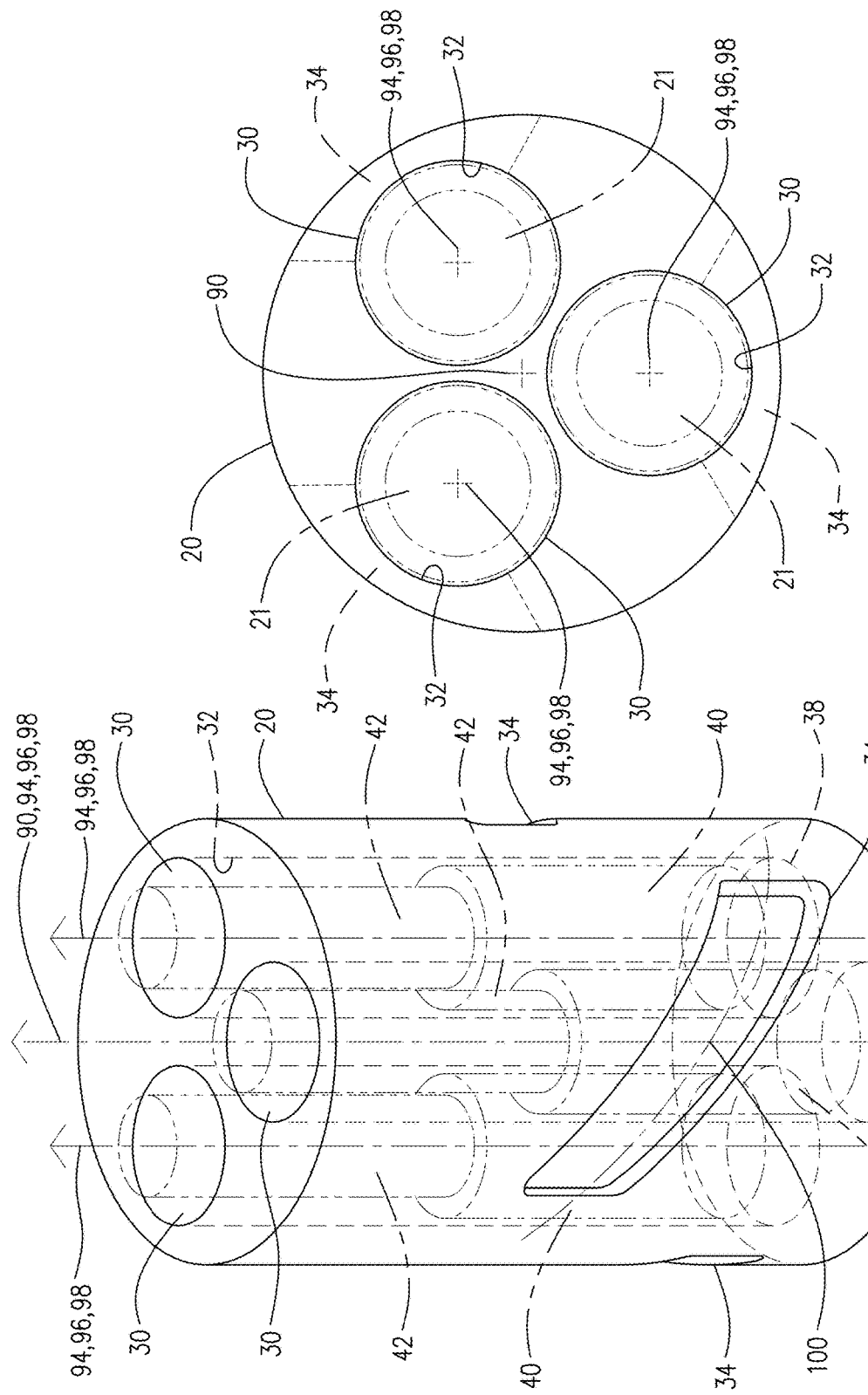
FIG. 7A
FIG. 7B

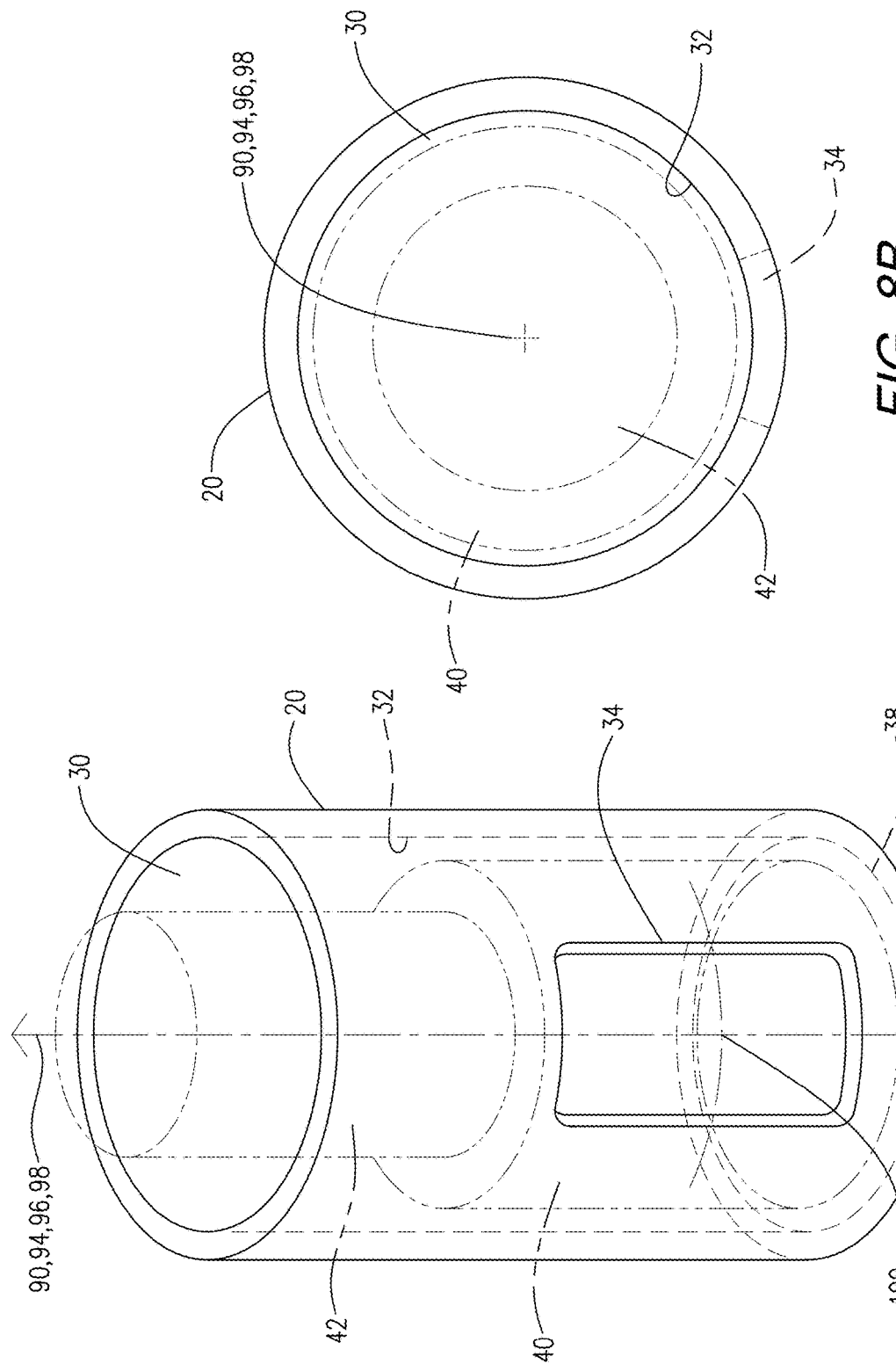

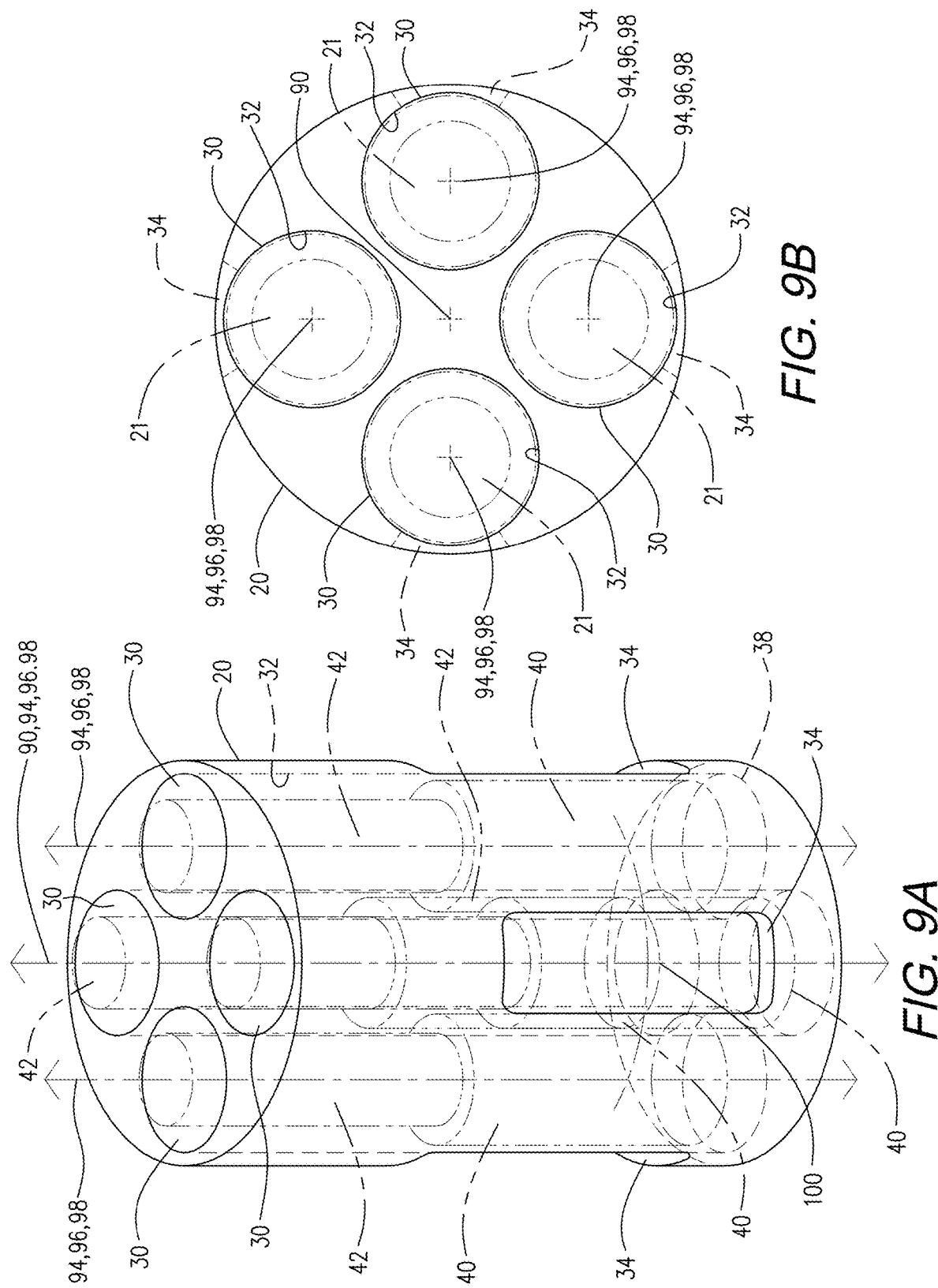

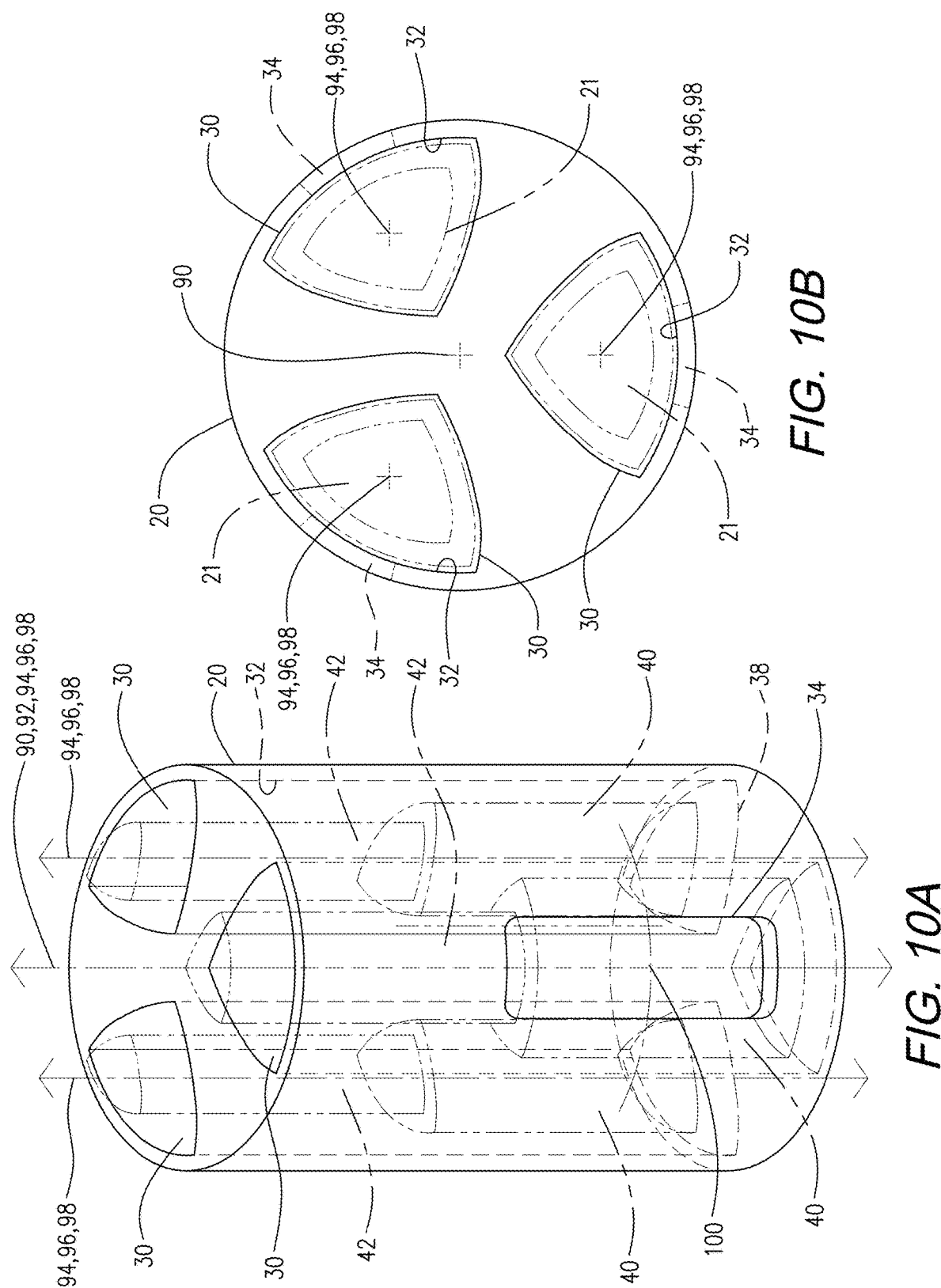

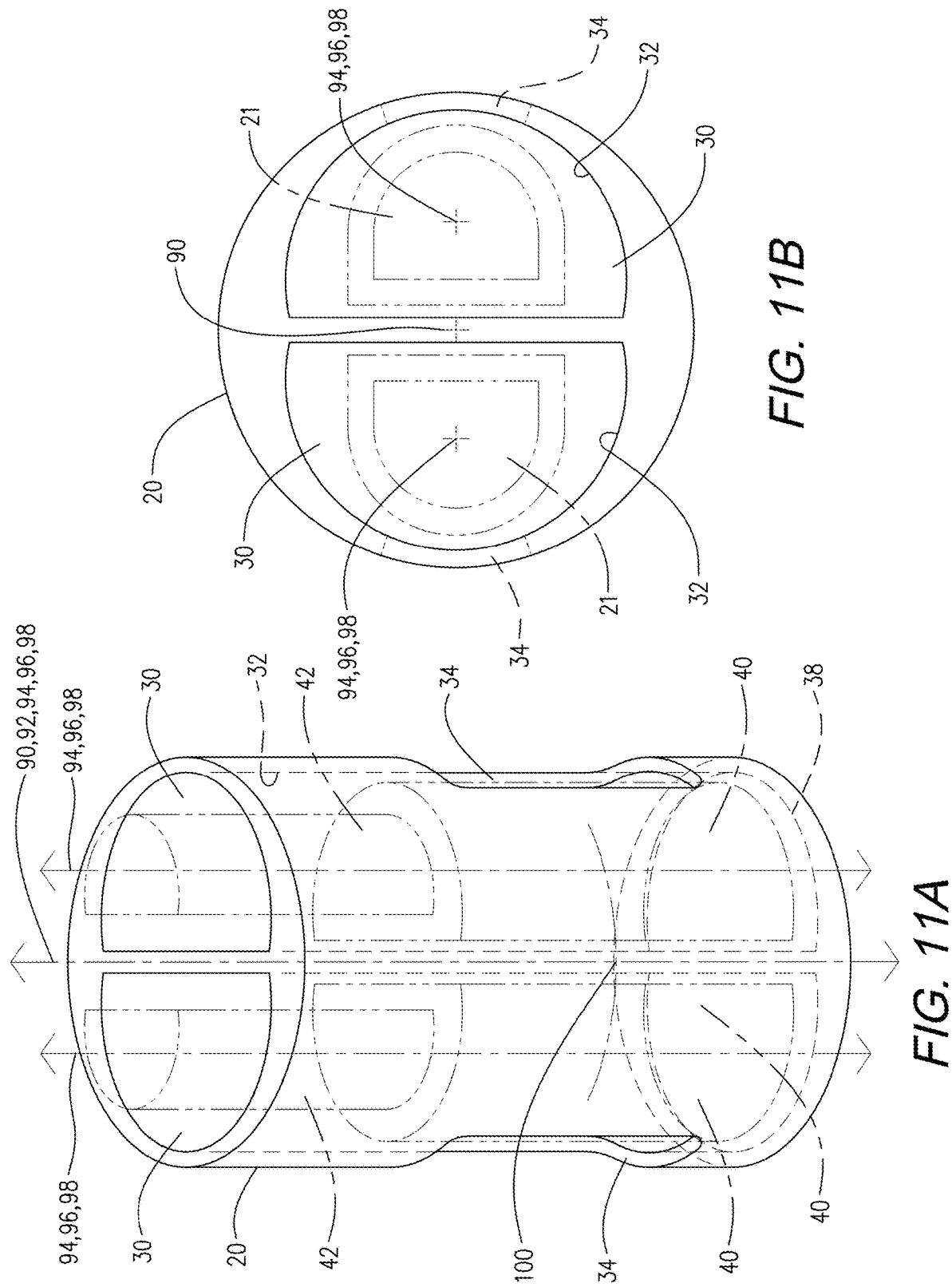

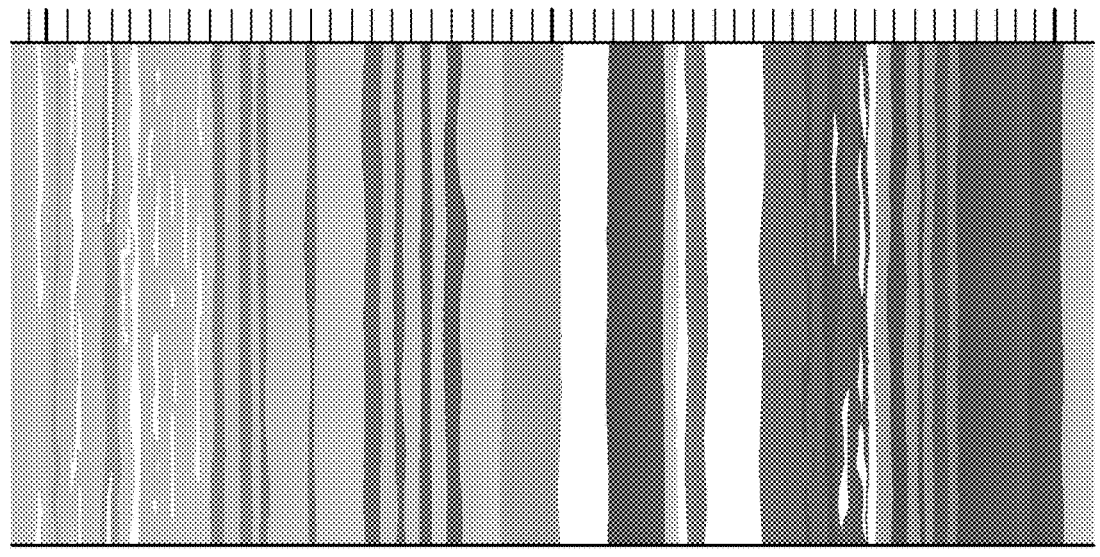
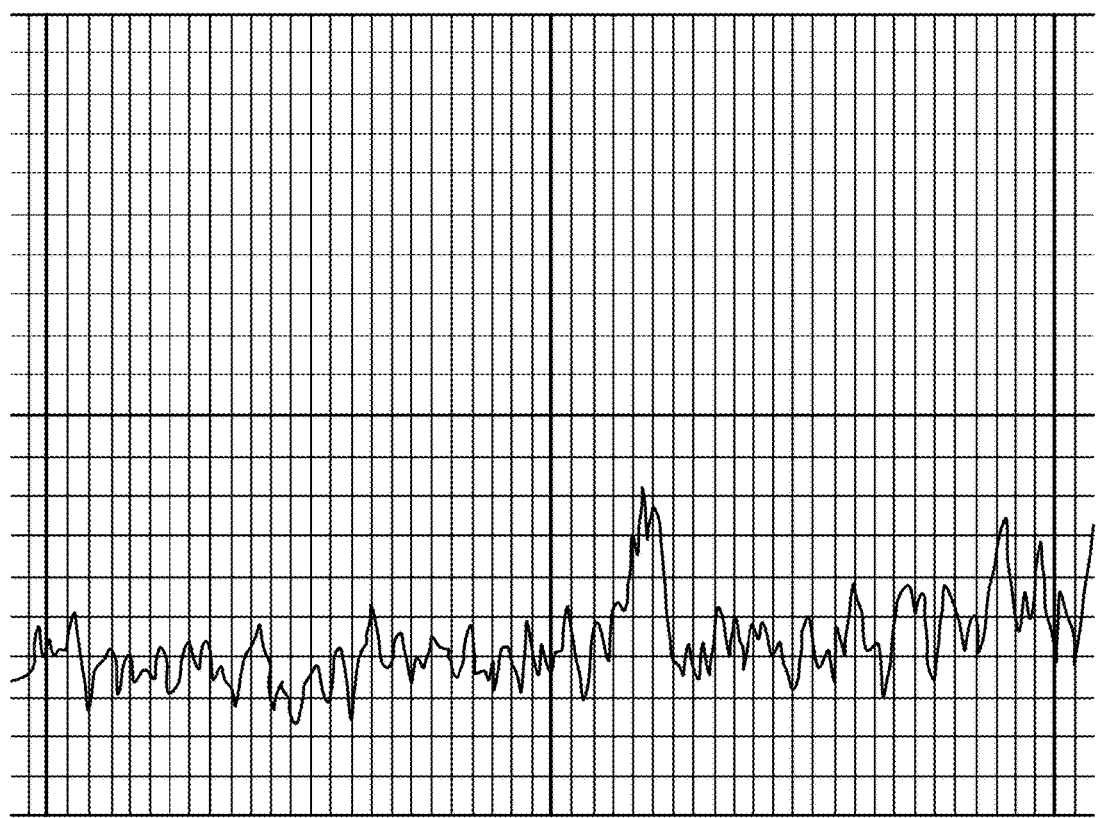
FIG. 13

GAMMA RAY LOGGING TOOL ASSEMBLY

BACKGROUND

An oil and gas well is created by drilling a wellbore on a desired surface site that extends from the surface to a certain depth into the ground. The wellbore penetrates the underlying earth and various subterranean formations or geologic units ("geologic units") therein. With proper planning and placement, one or more of the geologic units penetrated by the wellbore will include commercial quantities of hydrocarbons such as oil and/or gas.

After the wellbore is drilled to a target depth, casing is typically inserted in the wellbore. The casing, which usually extends to the total depth of the wellbore, isolates and seals off various geologic zones that have been penetrated by the wellbore and serves multiple other purposes. The casing is typically cemented in place by circulating a hydraulic cement composition into the annular space between the outside of the casing and the borehole wall and allowing the cement to harden into an impermeable mass. The cement sheath physically supports, positions and protects the casing in the wellbore and bonds the casing to the walls of the wellbore such that the undesirable migration of fluids between zones or formations penetrated by the wellbore is prevented.

Once the wellbore has been drilled and cased, the well is ready for the final completion and production phases. Final completion of the well includes the formation of one or more access conduits (for example, perforations) through the casing and cement sheath to provide communication between the wellbore and geologic unit(s) from which hydrocarbons are to be produced. In the production phase, hydrocarbons and other fluids in the geological unit(s) are allowed or caused to flow from the geologic unit(s) into the wellbore and then to the surface where they are processed for future use.

The production phase of a well can include primary, secondary, and even tertiary recovery efforts. However, despite these efforts, the amount of hydrocarbons or other useful fluids that can be produced from the well may ultimately diminish to the point that it is no longer economically feasible to continue producing from the well. At this point, the well is typically shut in and abandoned.

An important procedure that is often carried out on a well during one or more phases of the well involves gathering geologic and engineering data regarding the size and configuration of the borehole and the nature and characteristics of the surrounding geologic unit(s). The collection of such data, typically referred to as well logging, can be carried out by various methods during any phase of a well, and even in connection with wells that have been shut in and abandoned. Various specialized logging tools have been developed for use in connection with each method. The particular method and type of tool utilized will depend on several factors, including the phase of the well, whether the well is cased, the borehole inclination and condition, the type of geologic unit(s) penetrated by the wellbore, the cost of the procedure and the amount of time the procedure will take.

The type of data collected and the manner in which it is collected varies from tool to tool. For example, an active well logging tool emits a signal (for example, nuclear radiation, energy waves or high energy particles) into the wellbore and the surrounding geologic unit(s) in order to induce a return signal that can be received and recorded by the same tool for processing into useful data. A passive well logging tool, on the other hand, merely receives emitted signals that contain useful information from the geologic unit(s) penetrated by the wellbore.

A type of logging tool that is commonly used today is an image logging tool. An image logging tool is used to produce "images" of the borehole wall and the surrounding geologic unit(s) penetrated by the wellbore. For example, an image logging tool can be used to identify the dip and azimuth of the wellbore, fractures in the geologic unit(s), and the composition of the rock in the geologic unit(s) around the wellbore. Based on the dip and azimuth of the wellbore and the surrounding rock, it may be determined, for example, that the final location to which the wellbore is drilled needs to be changed, that the current wellbore needs to be re-drilled, and/or even that an additional wellbore needs to be drilled from a different location on the site in order to effectively and efficiently penetrate the most promising geologic unit(s). Based on the data collected, a useful well image log can be prepared that depicts the geologic unit(s) surrounding the wellbore. Image logging tools can be passive or active, and can be suitable for use in connection with uncased wells, cased wells, or both.

An example of a passive, well image logging tool that is suitable for use in connection with both uncased and cased wells is a gamma ray image logging tool. A gamma ray image logging tool senses gamma rays that are naturally emitted by the rock in the geological unit(s) penetrated by the wellbore. The quantity and properties of the detected gamma rays can provide useful information regarding the geologic unit(s). For example, the relative strength of the detected gamma rays and the change therein throughout a geological unit can be used to determine the nature of the rock and other materials in the geological unit. For example, the strength of gamma rays emitted by shale is different than the strength of gamma rays emitted by sand. The presence of hydrocarbons and/or water will also impact the signal and resulting data. The gamma ray data can be very valuable in the search for hydrocarbons and can dictate how the drilling and/or completion programs move forward.

The ultimate goal of any image logging tool, including gamma ray image logging tools, is to get an accurate representation of characteristics of the geologic unit(s) surrounding the wellbore. One measure of the quality of the representation that can be obtained is the signal-to-noise ratio (the "S/N Ratio") associated with use of the tool. Both the rock being penetrated and the logging tool used to record the data create noise, most of which is random and cannot be easily eliminated. Reducing the noise and maximizing the signal strength associated a well logging tool is typically a primary objective in the design and use of the tool. In addition to the S/N Ratio associated with an image logging tool, the resolution and contrast with respect to the produced "images" is very important.

There is a continuing need for image logging tools having high S/N Ratios and capable of producing "images" with improved resolution and contrast.

SUMMARY OF DISCLOSURE

In accordance with this disclosure, a well image logging tool assembly is provided. The well image logging tool assembly comprises at least one sensor unit, at least one spatial positioning device, and a cylindrical outer sheath, wherein the cylindrical outer sheath extends around and contains the sensor unit and the spatial positioning device. The sensor unit includes a solid cylindrical sensor body formed of a gamma ray shielding material, and at least one sensor assembly. The solid cylindrical sensor body includes a top end, a bottom end opposing the top end, an elongated mid-section connecting the top end and the bottom end together and having an outside surface, at least one longitudinal sensor cavity extending through at least one of the top end and the bottom end of the sensor body and including an inner wall, and a window corresponding to each sensor cavity and extending through the sensor body from the outside surface of the elongated mid-section to the corresponding sensor cavity. A sensor assembly is disposed in each sensor cavity. Each sensor assembly includes a gamma ray radiation sensor, and a photomultiplier tube associated with the gamma ray radiation sensor. The spatial positioning device is attached to the sensor body. Each window faces the other sheath.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure. Also, the various views in the drawings are shown in different scales in order to illustrate the invention and are not representative of the size of the actual logging tool and components thereof that are disclosed herein.

FIG. 2 is a cross-sectional view taken along the lines 2-2 of FIG. 1.

FIG. 3 is a cross-sectional view taken along the lines 3-3 of FIG. 2.

FIG. 5A is a sectional perspective view illustrating one embodiment of the sensor body and corresponding sensor assemblies of the sensor unit of the well image logging tool assembly disclosed herein.

FIG. 5B is a top view of the sensor body and corresponding sensor assemblies shown by FIG. 5A.

FIG. 6A is a sectional perspective view illustrating another embodiment of the sensor body and corresponding sensor assemblies of the sensor unit of the well image logging tool assembly disclosed herein.

FIG. 6B is a top view of the sensor body and corresponding sensor assemblies shown by FIG. 6A.

FIG. 7A is a sectional perspective view illustrating yet another embodiment of the sensor body and corresponding sensor assemblies of the sensor unit of the well image logging tool assembly disclosed herein.

FIG. 7B is a top view of the sensor body and corresponding sensor assemblies shown by FIG. 7A.

FIG. 8A is a sectional perspective view illustrating yet another embodiment of the sensor body and corresponding sensor assembly of the sensor unit of the well image logging tool assembly disclosed herein.

FIG. 8B is a top view of the sensor body and corresponding sensor assembly shown by FIG. 8A.

FIG. 9A is a sectional perspective view illustrating yet another embodiment of the sensor body and corresponding sensor assemblies of the sensor unit of the well image logging tool assembly disclosed herein.

FIG. 9B is a top view of the sensor body and corresponding sensor assemblies shown by FIG. 9A.

FIG. 10A is a sectional perspective view illustrating yet another embodiment of the sensor body and corresponding sensor assemblies of the sensor unit of the well image logging tool assembly disclosed herein. FIG. 10B is a top view of the sensor body and corresponding sensor assemblies shown by FIG. 10A.

FIG. 11A is a sectional perspective view illustrating yet another embodiment of the sensor body and corresponding sensor assemblies of the sensor unit of the well image logging tool assembly disclosed herein.

FIG. 11B is a top view of the sensor body and corresponding sensor assemblies shown by FIG. 11A.

FIG. 13 is an example of template of a well log that can be generated using the well image logging tool assembly disclosed herein.

DETAILED DESCRIPTION

Figure 1:
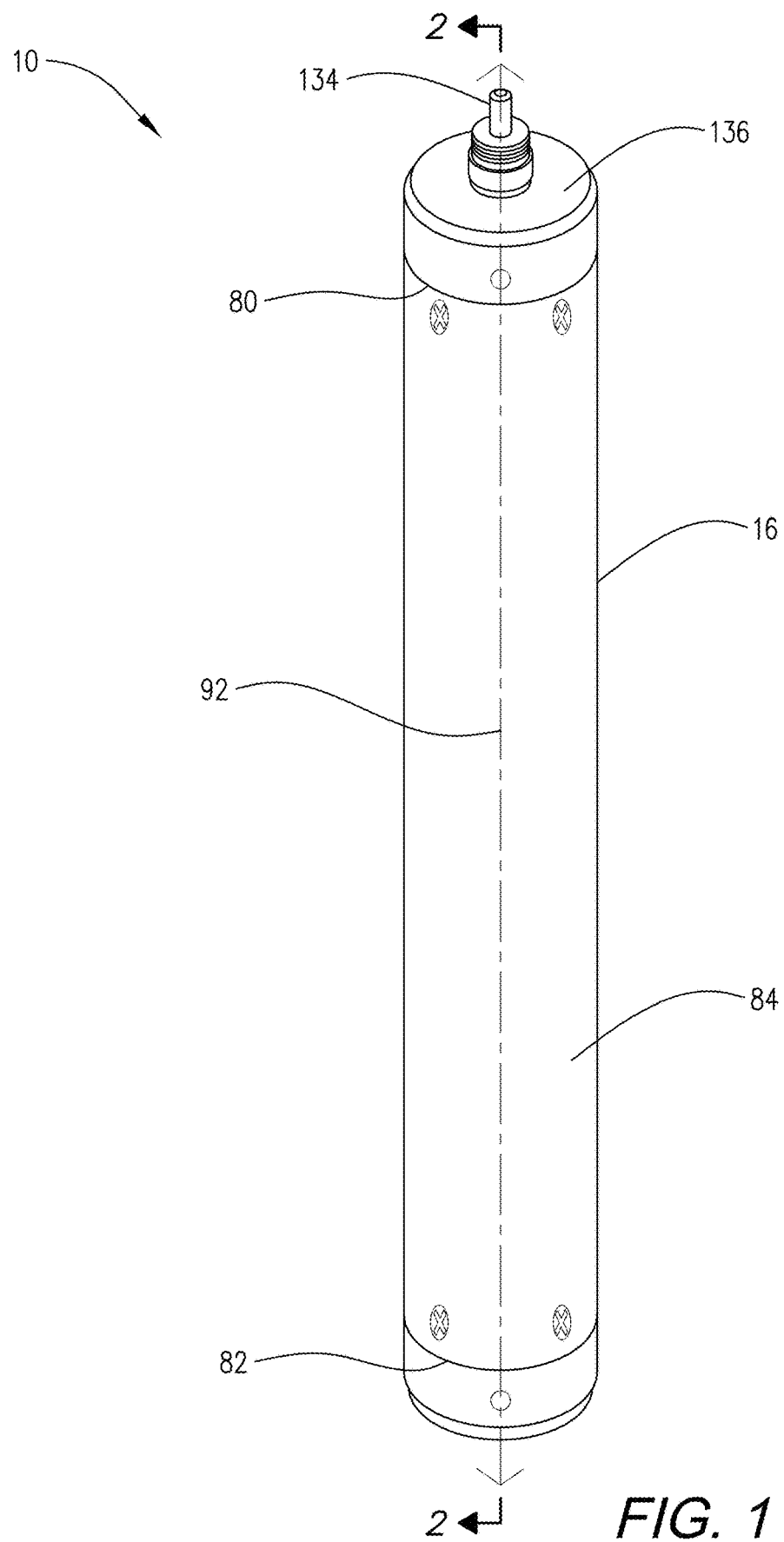
FIG. 1 is a perspective view of one embodiment of the well image logging tool assembly disclosed herein.

The present disclosure may be understood more readily by reference to this detailed description. For simplicity and clarity of illustration, where appropriate, reference numerals may be repeated among the different figures to indicate corresponding or analogous elements. In addition, numerous specific details are set forth in order to provide a thorough understanding of the various embodiments described herein. However, it will be understood by those of ordinary skill in the art that the embodiments described herein can be practiced without these specific details. In other instances, tools and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Definitions

As used herein and in the appended claims, the following terms and phrases have the corresponding definitions set forth below.

Terms of orientation (for example, describing the orientation of components of the logging tool assembly disclosed herein) such as vertical, horizontal, outwardly, top, bottom, lowermost, inwardly, downwardly, upwardly, "in front of," etc. are to be construed in view of the manner in which the logging tool assembly and components thereof are positioned and oriented in the drawings.

A "well" means a drilled wellbore and the geologic units surrounding or adjacent to the wellbore.

The terms "wellbore" and "borehole" are used interchangeably and mean the same thing.

The term "gamma ray shielding material" means a material that prevents at least some gamma rays that contact the material from passing through the material.

The term "gamma ray non-shielding material" means a material that allows at least 50% of gamma rays that contact the material to pass through the material.

A gamma ray radiation sensor "positioned in the sensor cavity in front of the corresponding window" means that the gamma ray radiation sensor is positioned in the sensor cavity in at least partial alignment with the window such that gamma ray radiation passing through the window can directly contact at least part of the sensor.

A gamma ray radiation sensor "positioned in substantial alignment with the window 34" means positioned in at least 75% alignment with the window.

A photomultiplier tube "associated with" the gamma ray radiation sensor means that the photomultiplier tube is directly or indirectly connected to the gamma ray radiation sensor.

A "cased well image logging tool assembly" means a logging tool assembly that can function in a cased well to generate a useful well image log corresponding to the well.

A "cased well" means a well in which the wellbore or a section thereof contains an annular casing (for example, an annular metal casing).

An "active well logging tool" means a well logging tool that emits a signal (for example, nuclear radiation, energy waves or high energy particles) into the wellbore and the surrounding geologic unit(s) in order to induce a return signal that can be received and recorded by the same tool for processing into useful data.

A "passive well logging tool" means a well logging tool that does not emit a signal into the wellbore in order to induce a return signal, but rather merely receives emitted signals that contain useful information from the geologic unit(s) penetrated by the wellbore.

An "oblong shape" means a shape that is elongated in one direction.

A "cylindrical shape" means a shape having straight parallel sides and a circular or oval cross-section.

A "well image log" means a well log including an image of all or a portion of a borehole wall and all or a portion of one or more geologic units surrounding or adjacent to the wellbore.

Unless stated otherwise, a component that is "attached to" another component can be attached directly or indirectly to the other component.

A component that "comprises" or "includes" one or more specified compounds means that the component includes the specified compound(s) alone, or includes the specified compound(s) together with one or more additional compounds.

A component that "consists of" one or more specified compounds means that the component includes only the specified compound(s).

A component that "consists essentially of" one or more specified compounds means that the component consists of the specified compound(s) alone, or consists of the specified compound(s) together with one or more additional compounds that do not materially affect the basic properties of the component.

Whenever a range is disclosed herein, the range includes independently and separately every member of the range extending between any two numbers enumerated within the range. Furthermore, the lowest and highest numbers of any range shall be understood to be included within the range set forth.

In accordance with this disclosure, a well image logging tool assembly is provided. In one embodiment, the logging tool assembly is a passive well image logging tool assembly. In another embodiment, the logging tool assembly is a passive cased well image logging tool assembly.

Referring now to FIGS. 1-13 of the drawings, various embodiments of the well image logging tool assembly, generally designated by the reference numeral 10, will be described. The well image logging tool assembly 10 comprises at least one sensor unit 12, at least one spatial positioning device 14, and a cylindrical outer sheath 16, wherein the outer sheath extends around and contains the sensor unit and the spatial positioning device.

The sensor unit 12 includes a solid cylindrical sensor body 20 formed of a gamma ray shielding material, and at least one sensor assembly 21.

The sensor body 20 includes a top end 22, a bottom end 24 opposing the top end, an elongated mid-section 26 connecting the top end 22 and the bottom 24 end together and having an outside surface 28, at least one longitudinal sensor cavity 30 extending through at least one of the top end and the bottom end of the sensor body and including an inner wall 32, and a window 34 corresponding to each sensor cavity and extending through the sensor body from the outside surface of the elongated mid-section to the corresponding sensor cavity.

The spatial positioning device 14 is attached to the sensor body 20. Each window 34 faces the outer sheath 16.

For example, in manufacturing the sensor body 20, the sensor body can start out as a solid block formed of the gamma ray shielding material. The sensor cavity or cavities 30 can then be formed by drilling one or more openings into the solid body 20 from either the top end 22 or bottom end 24 of the body 20 to a point 38 adjacent to the opposing top end or bottom end of the body. Alternatively, for example, one or more openings can be drilled into the solid body 20 from the top end 22 or bottom end 24 of the body 20 and through the opposing top or bottom end thereof. The window or windows 34 can then be cut into the sensor body 20 from the outside surface 28 of the mid-section 26 and through the inner wall 32 of the sensor cavity 30 thereby providing an opening between outside the sensor body and the sensor cavity.

As stated above, a "gamma ray shielding material" means a material that prevents at least some gamma rays that contact the material from passing through the material. For example, the gamma ray shielding material prevents at least 25% of gamma rays that contact the material from passing through the material. For example, the gamma ray shielding material prevents at least 50% of gamma rays that contact the material from passing through the material. For example, the gamma ray shielding material prevents at least 90% of gamma rays that contact the material from passing through the material. For example, the gamma ray shielding material prevents at least 99% of gamma rays that contact the material from passing through the material. For example, the gamma ray shielding material prevents at least 99.9% of gamma rays that contact the material from passing through the material. For example, the gamma ray shielding material prevents 100% of gamma rays that contact the material from passing through the material.

A sensor assembly 21 is disposed in each sensor cavity 30. Each sensor assembly 21 includes a gamma ray radiation sensor 40, and a photomultiplier tube 42 associated with the gamma ray radiation sensor. For example, each sensor assembly 21 can be disposed in the corresponding sensor cavity 30 such that the gamma ray radiation sensor 40 is positioned in the sensor cavity 30 in front of the corresponding window 34. As set forth above, the gamma ray radiation sensor 40 "positioned in the sensor cavity 30 in front of the corresponding window 34" means that the gamma ray radiation sensor 40 is positioned in the sensor cavity 30 in at least partial alignment with the window 34 such that gamma ray radiation passing through the window can directly contact at least part of the sensor 40. For example, the gamma ray radiation sensor 40 can be positioned in the sensor cavity in substantial alignment with the window 34 to increase the portion of the sensor 40 directly contacted by the gamma ray radiation passing through the window. For example, the gamma ray radiation sensor 40 can be positioned in the sensor cavity in full alignment with the window 34 to maximize the portion of the sensor 40 that is directly contacted by the gamma ray radiation passing through the window. As set forth above, a photomultiplier tube "associated with" the gamma ray radiation sensor means that the photomultiplier tube is directly or indirectly connected to the gamma ray radiation sensor. For example, the photomultiplier tube 42 and gamma ray radiation sensor 40 are connected such that a signal generated by the gamma ray radiation sensor can be conducted from the sensor into the photomultiplier tube, where it can be amplified thereby.

Figure 4:
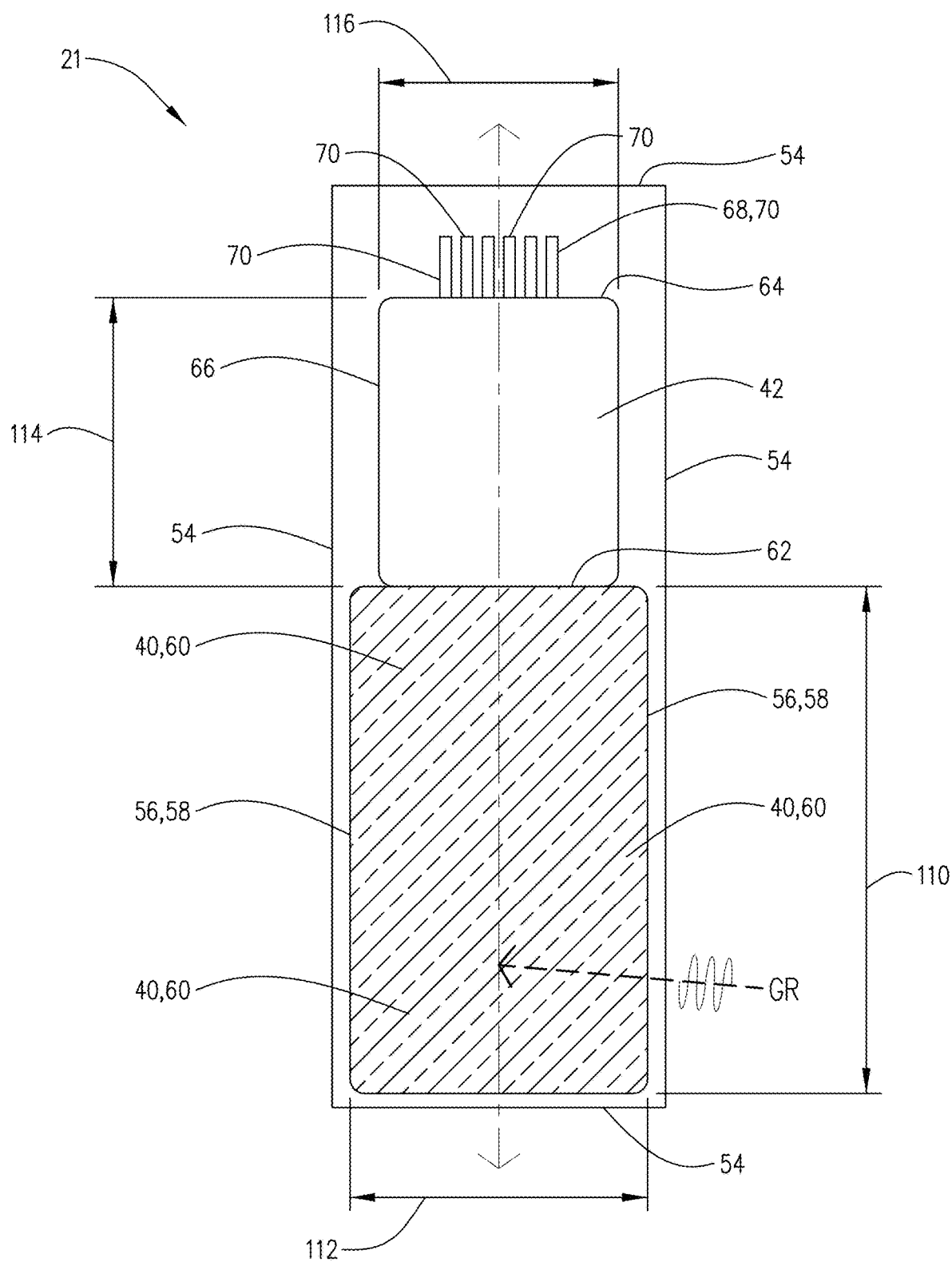
FIG. 4 is an enlarged sectional view of a sensor assembly of the sensor unit of the well image logging tool assembly illustrated by FIGS. 1, 2 and 3.

In the embodiment shown by the drawings and as best shown by FIG. 4, each sensor assembly 21 further includes an outer housing 54 that extends around and contains the gamma ray radiation sensor 40 and photomultiplier tube 42. The outer housing 54 is formed of a gamma ray non-shielding material. As stated above, a "gamma ray non-shielding material" means a material that allows at least 50% of gamma rays that contact the material to pass through the material. For example, the gamma ray non-shielding material allows at least 60% of gamma rays that contact the material to pass through the material. For example, the gamma ray non-shielding material allows at least 80% of gamma rays that contact the material to pass through the material. For example, the gamma ray non-shielding material allows at least 90% of gamma rays that contact the material to pass through the material. For example, the gamma ray non-shielding material allows at least 99% of gamma rays that contact the material to pass through the material. For example, the gamma ray non-shielding material allows at least 99.9% of gamma rays that contact the material to pass through the material. For example, the gamma ray non-shielding material allows 100% of gamma rays that contact the material to pass through the material. Examples of gamma ray non-shielding materials that can be used include aluminum and metal alloys. An example of a suitable metal alloy is steel. For example, the gamma ray non-shielding material is aluminum. For example, the gamma ray non-shielding material is a metal alloy. For example, the gamma ray non-shielding material is steel.

For example, the outer housing 54 can be formed of aluminum. For example, the outer housing 54 can be formed of steel.

In the embodiment shown by the drawings, the gamma ray radiation sensor 40 is a scintillation crystal assembly 56 comprising an inner crystal housing 58 and a scintillation crystal 60 that is contained by the housing. For example, the inner crystal housing 58 can be formed of a gamma ray non-shielding material. For example, the inner housing 58 can be formed of aluminum. For example, the inner housing 58 can be formed of steel.

For example, the scintillation crystal 60 is a solid glass-like crystal material. Examples of crystal materials that can be used include cesium iodide (CsI), bismuth germanate (BGO, for example, $Bi_4Ge_3O_{12}$), barium fluoride ($BaF_2$), gadolinium silicate (GSO, for example, $Gd_2SiO_5$), cesium fluoride ($CeF_2$), and sodium iodide (NaI). For example, the crystal material can be sodium iodide. For example, the scintillation crystal 60 fills the whole volume of the inner crystal housing 58. For example, when a gamma ray enters inner crystal housing 58, it bounces around throughout the crystal causing the crystal to flash multiple times.

Other types of sensors (e.g., other than a scintillation crystal assembly) can be used as the gamma ray radiation sensor 40 as well.

In the embodiment shown by the drawings, the photomultiplier tube 42 is connected directly to the gamma ray radiation sensor 40. For example, one or more signals (e.g., multiple flashes created by the crystal 60) travel into the photomultiplier tube where they are amplified.

The photomultiplier tube 42 includes a first end 62, a second end 64, and an outer wall 66. The second end 64 of the photomultiplier tube 42 is attached to the gamma ray radiation sensor 40. The first end 62 of the photomultiplier tube 42 includes an electrical connector 68 that includes a plurality of pins 70 and can be attached to one or more cables and used to conduct the signal generated by the gamma ray radiation sensor 40 and amplified by the photomultiplier tube 42 to a recording device, computer or other device (not shown by the drawings).

The spatial positioning device 14 is capable of continuously collecting sensor position data reflecting the xyz spatial position of the gamma ray radiation sensors in the wellbore relative to the wellbore and the Earth as the logging tool assembly is moved through the wellbore.

The outer sheath 16 includes a top 80, a bottom 82, and a solid cylindrical outer wall 84 connecting the top and the bottom together. In this embodiment, the outer sheath 16 is formed of a gamma ray non-shielding material so that gamma ray radiation can pass through the sheath. This allows gamma rays to penetrate the outer wall 84 of the outer sheath 16, enter the window 34 and reach the gamma ray radiation sensor 40. For example, the outer sheath 16 can be formed of titanium. For example, the outer sheath 16 can be formed of steel.

For example, as shown by the drawings, the sensor body 20 has an oblong shape and a central longitudinal axis 90. Similarly, the outer sheath 16 has an oblong shape and a central longitudinal axis 92. The central longitudinal axis 92 of the outer sheath 16 is aligned with the central longitudinal axis 90 of the sensor body 20.

Each of the sensor cavities 30 has an oblong shape and a central longitudinal axis 94. The central longitudinal axis 94 of each sensor cavity is parallel to the central longitudinal axis 90 of the sensor body 20.

Each of the gamma ray radiation sensors 40 has an oblong shape and a central longitudinal axis 96. The central longitudinal axis 96 of each of the gamma ray radiation sensors is aligned with the central longitudinal axis 94 of the corresponding sensor cavity 30. Similarly, each of the photomultiplier tubes 42 has an oblong shape and a central longitudinal axis 98. The central longitudinal axis 98 of each of the photomultiplier tubes is aligned with the central longitudinal axis 94 of the corresponding sensor cavity 30 and the central longitudinal axis 96 of the sensor 40.

For example, in the embodiments shown by the drawings, each of the windows 34 has an oblong shape and a central longitudinal axis 100.

In the embodiment shown by FIGS. 2, 5A, 5B, 8A, 8B, 9A, 9B, 10A, 10B, 11A and 11B, the central longitudinal axis 100 of each of the windows 34 is parallel to the central longitudinal axis 94 of the corresponding sensor cavity 30. Alternatively, as shown by FIGS. 6A, 6B, 7A and 7B, the central longitudinal axis 100 of each of the windows 34 can traverse the central longitudinal axis 94 of the corresponding sensor cavity 30. For example, the central longitudinal axis 100 of each of the windows 34 can extend at an angle in the range of about 20° to about 160° with respect to the central longitudinal axis 94 of the corresponding cavity 30. For example, the central longitudinal axis 100 of each of the windows 34 can extend at an angle in the range of about 40° to about 140° with respect to the central longitudinal axis 94 of the corresponding cavity 30. For example, as shown by FIGS. 6A and 6B, the central longitudinal axis 100 of each of the windows 34 extends at an angle in the range of about 90° with respect to (i.e., is perpendicular to) the central longitudinal axis 94 of the corresponding cavity 30. For example, as shown by FIGS. 7A and 7B, the central longitudinal axis of each of the windows 34 extends at an angle of about 45° with respect to the central longitudinal axis 94 of the corresponding sensor cavity 30.

The size and orientation of the window(s) 34 can be varied control the crystal focus area and improve the contrast and resolution associated with the logging tool assembly 10. For example, the window(s) 34 can be used to narrow the crystal focus area and improve the vertical resolution of the assembly.

For example, the gamma ray radiation sensor 40 of each of the sensor assemblies 21 can have a cylindrical shape. In this embodiment, each sensor 40 has a length 110 and a diameter 112, and the ratio of the length 110 to the diameter 112 of each sensor is at least about 2:1.

For example, the photomultiplier tube 42 of each of the sensor assemblies 21 can have a cylindrical shape. In this embodiment, each photomultiplier tube 42 has a length 114 and a diameter 116, and the ratio of the length 114 to the diameter 116 of each photomultiplier tube is at least about 2:1.

For example, although they can have different lengths, the gamma ray radiation sensor 40 and the photomultiplier tube 42 of each of the sensor assemblies 21 can have the same shape (e.g., cylindrical, rectangular). For example, both the gamma ray radiation sensor 40 and the photomultiplier tube 42 of each of the sensor assemblies 36 can have a cylindrical shape. For example, both the gamma ray radiation sensor 40 and the photomultiplier tube 42 of each of the sensor assemblies 21 can have a cylindrical shape and have the same diameter.

For example, as shown by FIGS. 10A and 10B, the sensor cavities 30 and sensors 40 of the sensor assembly 21 can both have the cross-sectional shape of a curvilinear triangle. For example, in this embodiment, the sensor body 20 of each sensor unit 12 can include three sensor cavities 30 and corresponding windows 34. For example, as shown by FIGS. 11A and 11B, the sensor cavities 30 and sensors 40 of the sensor assembly 21 can both have the cross-sectional shape of a semi-oval. For example, in this embodiment, the sensor body 20 of each sensor unit 12 can include two sensor cavities 30 and corresponding windows 34. The alternative sensor cavity and sensor shapes of the embodiments shown by FIGS. 10A, 10B, 11A and 11B can used to increase the collective sizes of the sensors 40 with respect to the size of the sensor body 20.

For example, as shown by FIGS. 8A and 8B, the sensor body 20 of each sensor unit 12 of the logging tool assembly can include a single sensor cavity 30 and corresponding window 34. In this embodiment, the sensor cavity 30 can have a volume that is at least about 50% of the volume of the sensor body 20. For example, in this embodiment, the sensor cavity 30 and the sensor 40 disposed therein can each have a cylindrical shape, wherein the diameter of the sensor is at least about 80% of the diameter of the sensor cavity.

For example, the sensor body 20 of each sensor unit 12 of the logging tool assembly 10 can include at least two sensor cavities 30 and corresponding windows 34. For example, in this embodiment, the collective volume of the sensor cavities can be at least about 25% of the volume of the sensor body. For example, in this embodiment, each of the sensor cavities 30 and sensors 40 disposed therein can have a cylindrical shape, wherein the diameter of each of the sensors is at least about 50% of the diameter of the corresponding sensor cavity. For example, in this embodiment, each of the sensor cavities 30 and sensors 40 disposed therein can have a cylindrical shape, wherein the diameter of each of the sensors is at least about 80% of the diameter of the corresponding sensor cavity. For example, in this embodiment, the central longitudinal axis 94 of each sensor cavity 30 can be parallel to on another.

As shown by FIGS. 2, 3, 5A, 5B, 6A, 6B, 7A and 7B, the sensor body 20 of each sensor unit 12 of the logging tool assembly 10 can include at three sensor cavities 30 and corresponding windows 34. As shown by FIGS. 9A and 9B, the sensor body 20 of each sensor unit 12 of the logging tool assembly 10 can include at four sensor cavities 30 and corresponding windows 34. For example, the sensor body 20 of each sensor unit 12 of the logging tool assembly 10 can include at five sensor cavities 30 and corresponding windows 34. For example, the sensor body 20 of each sensor unit 12 of the logging tool assembly 10 can include at six sensor cavities 30 and corresponding windows 34.

The size of the gamma ray radiation sensor 40 of each sensor assembly 36 is dependent on the number of sensor assemblies included in the sensor unit 12, with the size of the gamma ray radiation sensor of each sensor assembly decreasing as the number of sensors assemblies in the sensor unit increases. Similarly, the size of the photomultiplier tube 42 of each sensor assembly 21 is dependent on the number of sensor assemblies included in the sensor unit 12, with the size of the photomultiplier tube of each sensor assembly decreasing as the number of sensors assemblies in the sensor unit increases.

The size of the window 34 in each of the sensor cavities 30 is dependent on the size of the gamma ray radiation sensor 40 in the corresponding sensor assembly 21 in the sensor cavity, with the size of each window increasing as the size of the gamma ray radiation sensor in the corresponding sensor assembly increases.

For example, the logging tool assembly 10 can include at least two sensor units 12, with each sensor unit being positioned within the outer sheath 16 one on top of the other. In this embodiment, the number of sensor cavities 30 and corresponding sensor assemblies 21 in at least one of the sensor units 12 can differ from the number of sensor cavities and corresponding sensor assemblies in at least one of the other sensor units. As best shown by FIGS. 2 and 3, the logging tool assembly 10 includes three sensor units 12, with each sensor unit positioned in the outer sheath 16 one on top of the other, with the number of sensor cavities 30 and corresponding sensor assemblies 21 in each sensor unit being the same. For example, as many as 10 sensor units 12 can be positioned in the outer sheath one on top of the other.

A signal processing unit 120 can be attached to the logging tool assembly 10. Alternatively, the signal processing unit 120 can be positioned on the surface or at some other location. An omnidirectional gamma ray device 122 can also attached to the logging tool assembly 10. The omnidirectional gamma ray device 122 functions to provide a base line for offset normalization of gamma rays.

Figure 12:
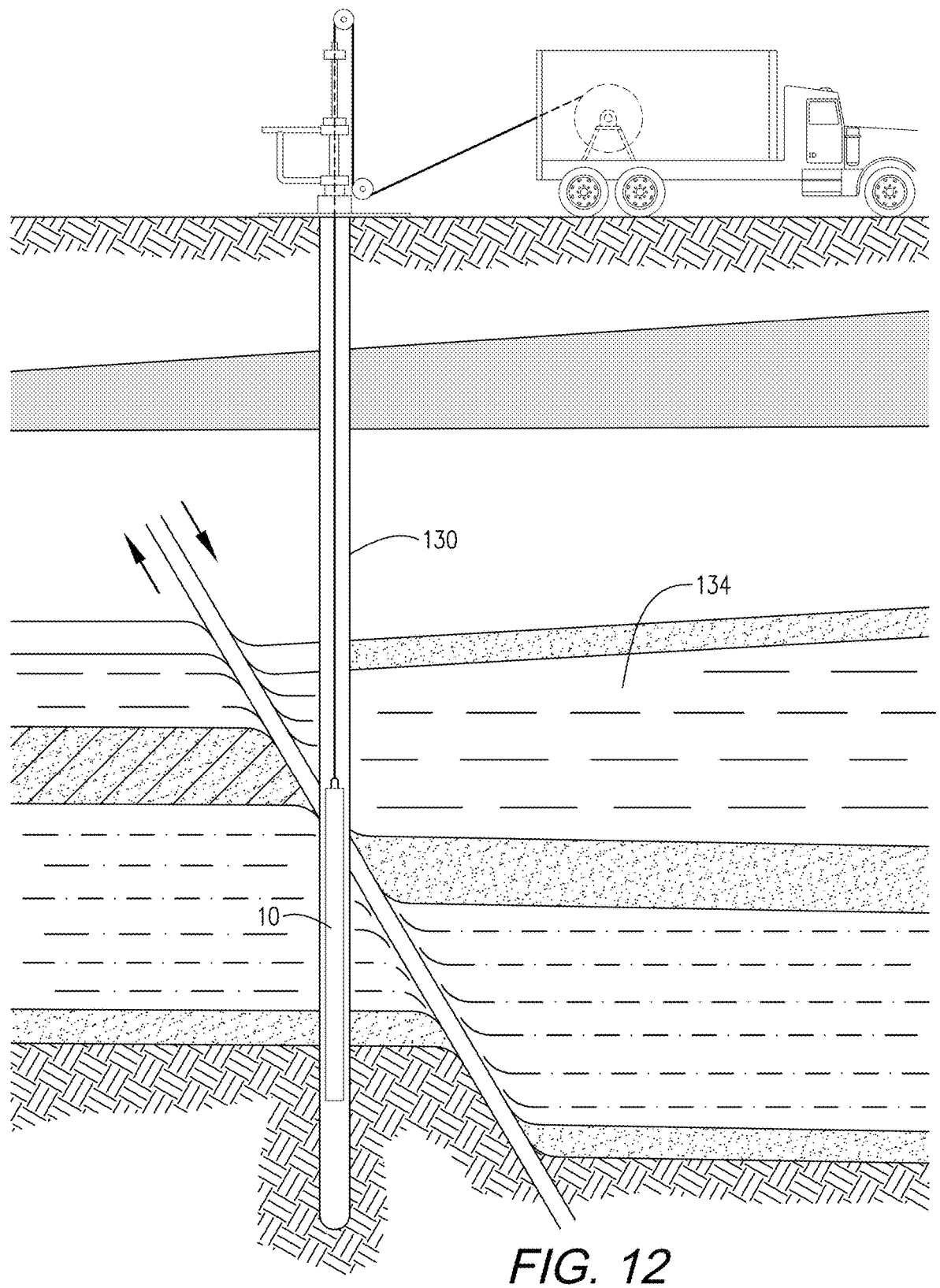
FIG. 12 is a perspective view of the well image logging tool assembly disclosed herein in a wellbore.

FIG. 12 illustrates the well image logging tool assembly 10 being deployed in a well bore 130. The gamma ray radiation sensor 40 of each sensor assembly 36 is capable of continuously collecting gamma ray radiation data from one or more geologic units 132 surrounding or adjacent to the wellbore 130 as the logging tool assembly 110 is moved through the wellbore.

An attachment assembly 134 for allowing the logging tool assembly 10 to be attached to the end of a cable wireline, coiled tubing, or tractor assembly for example, is attached to the top 136 of the logging tool assembly 10. For example, as known to those skilled in the art, the attachment assembly 134 can have a structure that allows the end of a wireline cable to be attached thereto.

Although not shown by the drawings, the logging tool assembly 10 also includes a number of other components including one or more circuits and systems (not shown) necessary to allow the sensor assemblies to communicate with the signal processing unit (for example, to allow the sensor assemblies to transmit the data they collect and their position relative to the tool body to the signal processing unit), and to otherwise operate the tool as desired. For example, a standard centralizer can be used to center the tool assembly 10 in the borehole.

Although the logging tool assembly 10 can be used in connection with both cased wells and uncased wells, the fact that the logging tool assembly 10 relies on gamma rays makes it very suitable for use in connection with cased wells.

FIG. 13 illustrates a template of a well log that can be generated using the well image logging tool assembly disclosed herein.

For example, in one embodiment, the well image logging tool assembly 10 comprises at least one sensor unit 12, at least one spatial positioning device 14, and a cylindrical outer sheath 16, wherein the cylindrical outer sheath extends around and contains the sensor unit and the spatial positioning device. The sensor unit includes a solid cylindrical sensor body 20 formed of a gamma ray shielding material, and at least one sensor assembly 21. The solid cylindrical sensor body 20 includes a top end 22, a bottom end 24 opposing the top end, an elongated mid-section 26 connecting the top end and the bottom end together and having an outside surface 28, at least one longitudinal sensor cavity 30 extending through at least one of the top end and the bottom end of the sensor body and including an inner wall 32, and a window 34 corresponding to each sensor cavity and extending through the sensor body from the outside surface of the elongated mid-section to the corresponding sensor cavity. A sensor assembly 21 is disposed in each sensor cavity 30. Each sensor assembly 21 includes a gamma ray radiation sensor 40, and a photomultiplier tube 42 associated with the gamma ray radiation sensor. The spatial positioning device 14 is attached to the sensor body 20. Each window 34 faces the other sheath 16.

In another embodiment, the well image logging tool assembly 10 is a passive cased well image logging tool assembly. The passive cased well logging tool assembly 10 comprises at least one sensor unit 12, at least one spatial positioning device 14, and a cylindrical outer sheath 16, wherein the cylindrical outer sheath extends around and contains the sensor unit and the spatial positioning device. The sensor unit includes a solid cylindrical sensor body 20 formed of a gamma ray shielding material, and at least one sensor assembly 21. The solid cylindrical sensor body 20 includes a top end 22, a bottom end 24 opposing the top end, an elongated mid-section 26 connecting the top end and the bottom end together and having an outside surface 28, at least one longitudinal sensor cavity 30 extending through at least one of the top end and the bottom end of the sensor body and including an inner wall 32, and a window 34 corresponding to each sensor cavity and extending through the sensor body from the outside surface of the elongated mid-section to the corresponding sensor cavity. A sensor assembly 21 is disposed in each sensor cavity 30. Each sensor assembly 21 includes a gamma ray radiation sensor 40, and a photomultiplier tube 42 associated with the gamma ray radiation sensor. Each sensor assembly 21 is disposed in the corresponding sensor cavity 30 such that the gamma ray radiation sensor 40 is positioned in the sensor cavity in front of the corresponding window 34. The spatial positioning device 14 is attached to the sensor body 20. Each window 34 faces the other sheath 16.

In yet another embodiment, the well image logging tool assembly 10 is a passive cased well image logging tool assembly. In this embodiment, the passive cased well logging tool assembly 10 comprises at least two sensor units 12, at least one spatial positioning device 14, and a cylindrical outer sheath 16, wherein the cylindrical outer sheath extends around and contains the sensor units and the spatial positioning device. Each sensor unit 12 includes a solid cylindrical sensor body 20 formed of a gamma ray shielding material, and at least one sensor assembly 21. The solid cylindrical sensor body 20 includes a top end 22, a bottom end 24 opposing the top end, an elongated mid-section 26 connecting the top end and the bottom end together and having an outside surface 28, at least one longitudinal sensor cavity 30 extending through at least one of the top end and the bottom end of the sensor body and including an inner wall 32, and a window 34 corresponding to each sensor cavity and extending through the sensor body from the outside surface of the elongated mid-section to the corresponding sensor cavity. A sensor assembly 21 is disposed in each sensor cavity 30. Each sensor assembly 21 includes a scintillation crystal assembly 56, and a photomultiplier tube 42 associated with the scintillation crystal assembly. The scintillation crystal assembly 56 comprises an inner crystal housing 58, and a scintillation crystal 60 contained by the housing. Each sensor assembly 21 is disposed in the corresponding sensor cavity 30 such that the gamma ray radiation sensor 40 is positioned in the sensor cavity in front of the corresponding window 34. The spatial positioning device 14 is attached to the sensor body 20. Each window 34 faces the other sheath 16. Each sensor unit 12 is positioned within the outer sheath 16 one on top of the other.

Therefore, the logging tool assembly 10 disclosed herein is well adapted to attain the ends and advantages mentioned, as well as those that are inherent therein. The particular embodiments disclosed above are illustrative only, as the present logging tool assembly may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present treatment additives and methods. While the method and logging tool assembly are described in terms of "comprising," "containing," "having," or "including" various components or steps, the method and logging tool assembly can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A well image logging tool assembly, comprising:
   at least one sensor unit, said sensor unit including:
      a solid cylindrical sensor body formed of a gamma ray shielding material and including:
         a top end;
         a bottom end opposing said top end;
         an elongated mid-section connecting said top end and said bottom end together and having an outside surface;
         at least one longitudinal sensor cavity extending through at least one of said top end and said bottom end of the sensor body and including an inner wall; and
         a window corresponding to each sensor cavity and extending through said sensor body from said outside surface of said elongated mid-section to said corresponding sensor cavity; and
      a sensor assembly disposed in each sensor cavity, wherein each sensor assembly includes:
         a gamma ray radiation sensor; and
         a photomultiplier tube associated with said gamma ray radiation sensor;
      at least one spatial positioning device attached to said sensor body; and
      a cylindrical outer sheath, wherein said outer sheath extends around and contains said sensor unit and said spatial positioning device, and wherein each window faces said outer sheath.

2. The logging tool assembly of claim 1, wherein said logging tool assembly is a passive well image logging tool assembly.

3. The logging tool assembly of claim 1, wherein said logging tool assembly is a passive cased well image logging tool assembly.

4. The logging tool assembly of claim 1, wherein each sensor assembly is disposed in said corresponding sensor cavity such that said gamma ray radiation sensor is positioned in said sensor cavity in front of said corresponding window.

5. The logging tool assembly of claim 1, wherein each sensor assembly further includes an outer housing that extends around and contains said gamma ray radiation sensor and said photomultiplier tube.

6. The logging tool assembly of claim 1, wherein said gamma ray radiation sensor is a scintillation crystal assembly comprising an inner crystal housing and a scintillation crystal contained by said housing.

7. The logging tool assembly of claim 6, wherein said inner crystal housing is formed of a gamma ray non-shielding material.

8. The logging tool assembly of claim 1, wherein said photomultiplier tube is connected directly to said gamma ray radiation sensor.

9. The logging tool assembly of claim 1, wherein said outer sheath is formed of a gamma ray non-shielding material.

10. The logging tool assembly of claim 1, wherein said sensor body has an oblong shape and a central longitudinal axis.

11. The logging tool assembly of claim 1, wherein each of said sensor cavities has an oblong shape and a central longitudinal axis.

12. The logging tool assembly of claim 11, wherein each of said gamma ray radiation sensors has an oblong shape and a central longitudinal axis, said central longitudinal axis of each of said sensors being aligned with said central longitudinal axis of said corresponding sensor cavity.

13. The logging tool assembly of claim 11, wherein each of said windows has an oblong shape and a central longitudinal axis.

14. The logging tool assembly of claim 13, wherein said central longitudinal axis of each of said windows is parallel to said central longitudinal axis of said corresponding sensor cavity.

15. The logging tool assembly of claim 13, wherein said central longitudinal axis of each of said windows traverses said central longitudinal axis of said corresponding sensor cavity.

16. The logging tool assembly of claim 15, wherein said central longitudinal axis of each of said windows extends at an angle in the range of about 20° to about 160° with respect to said central longitudinal axis of said corresponding cavity.

17. The logging tool assembly of claim 16, wherein said central longitudinal axis of each of said windows extends at an angle in the range of about 40° to about 140° with respect to said central longitudinal axis of said corresponding cavity.

18. The logging tool assembly of claim 17, wherein said central longitudinal axis of each of said windows is perpendicular to said central longitudinal axis of said corresponding sensor cavity.

19. The logging tool assembly of claim 17, wherein said central longitudinal axis of each of said windows extends at an angle of about 45° with respect to said central longitudinal axis of said corresponding cavity.

20. The logging tool assembly of claim 1, wherein said gamma ray radiation sensor of each of said sensor assemblies has a cylindrical shape.

21. The logging tool assembly of claim 20, wherein each sensor has a length and a diameter, and wherein the ratio of the length to the diameter of each sensor is at least about 2:1.

22. The logging tool assembly of claim 1, wherein said photomultiplier tube of each of said sensor assemblies has a cylindrical shape.

23. The logging tool assembly of claim 22, wherein each photomultiplier tube has a length and a diameter, and wherein the ratio of the length to the diameter of each photomultiplier tube is at least about 2:1.

24. The logging tool assembly of claim 1, wherein although they can have different lengths, said gamma ray radiation sensor and said photomultiplier tube of each of said sensor assemblies have the same shape.

25. The logging tool assembly of claim 24, wherein both the gamma ray radiation sensor and the photomultiplier tube of each of said sensor assemblies can have a cylindrical shape.

26. The logging tool assembly of claim 25, wherein both said gamma ray radiation sensor and said photomultiplier tube of each of said sensor assemblies have a cylindrical shape and have the same diameter.

27. The logging tool assembly of claim 1, wherein said sensor cavities and said sensors of said sensor assemblies both have the cross-sectional shape of a curvilinear triangle.

28. The logging tool assembly of claim 1, wherein said sensor cavities and said sensors of said sensor assemblies both have the cross-sectional shape of a semi-oval.

29. The logging tool assembly of claim 1, wherein the sensor body of each sensor unit includes a single sensor cavity and corresponding window.

30. The logging tool assembly of claim 29, wherein said sensor cavity has a volume that is at least about 50% of the volume of said sensor body.

31. The logging tool assembly of claim 29, wherein said sensor cavity and said sensor disposed therein each have a cylindrical shape, wherein the diameter of said sensor is at least about 80% of the diameter of said sensor cavity.

32. The logging tool assembly of claim 1, wherein said sensor body of each sensor unit includes at least two sensor cavities and corresponding windows.

33. The logging tool assembly of claim 32, wherein the collective volume of said sensor cavities is at least 25% of the volume of said sensor body.

34. The logging tool assembly of claim 32, wherein each of said sensor cavities and sensors disposed therein have a cylindrical shape, and wherein the diameter of each of said sensors is at least about 50% of the diameter of said corresponding sensor cavity.

35. The logging tool assembly of claim 32, wherein said central longitudinal axis of each sensor cavity are parallel to one another.

36. The logging tool assembly of claim 32, wherein said sensor body of each sensor unit includes three sensor cavities and corresponding windows.

37. The logging tool assembly of claim 32, wherein said sensor body of each sensor unit includes four sensor cavities and corresponding windows.

38. The logging tool assembly of claim 1, wherein the size of said gamma ray radiation sensor of each sensor assembly is dependent on the number of sensor assemblies included in said sensor unit, with the size of said gamma ray radiation sensor of each sensor assembly decreasing as the number of sensors assemblies in said sensor unit increases.

39. The logging tool assembly of claim 1, wherein the size of said photomultiplier tube of each sensor assembly is dependent on the number of sensor assemblies included in said sensor unit, with the size of said photomultiplier tube of each sensor assembly decreasing as the number of sensors assemblies in said sensor unit increases.

40. The logging tool assembly of claim 1, wherein the size of said window in each of said sensor cavities is dependent on the size of the gamma ray radiation sensor in the corresponding sensor assembly in said sensor cavity, with the size of each window increasing as the size of the gamma ray radiation sensor in the corresponding sensor assembly increases.

41. The logging tool assembly of claim 1, wherein said logging tool assembly includes at least two sensor units, with each sensor unit being positioned within said outer sheath one on top of the other.

42. The logging tool assembly of claim 41, wherein the number of sensor cavities and sensor assemblies in at least one of said sensor units differs from the number of sensor cavities and sensor assemblies in at least one of the other sensor units.

43. The logging tool assembly of claim 41, wherein said logging tool assembly includes three sensor units, each sensor unit being positioned within said outer sheath one on top of the other with the number of sensor cavities and sensor assemblies in each sensor unit being the same.

44. A passive cased well image logging tool assembly, comprising:
at least one sensor unit, said sensor unit including:
a solid cylindrical sensor body formed of a gamma ray shielding material and including:
a top end;
a bottom end opposing said top end;
an elongated mid-section connecting said top end and said bottom end together and having an outside surface;
at least one longitudinal sensor cavity extending through at least one of said top end and said bottom end of the sensor body and including an inner wall; and
a window corresponding to each sensor cavity and extending through said sensor body from said outside surface of said elongated mid-section to said corresponding sensor cavity; and
a sensor assembly disposed in each sensor cavity, wherein each sensor assembly includes:
a gamma ray radiation sensor; and
a photomultiplier tube associated with said gamma ray radiation sensor;
at least one spatial positioning device attached to said sensor body, wherein each sensor assembly is disposed in said corresponding sensor cavity such that said gamma ray radiation sensor is positioned in said sensor cavity in front of said corresponding window; and
a cylindrical outer sheath, wherein said outer sheath extends around and contains said sensor unit and said spatial positioning device, and wherein each window faces said outer sheath.

45. A passive cased well image logging tool assembly, comprising:
at least two sensor units, said of said sensor units including:
a solid cylindrical sensor body formed of a gamma ray shielding material and including:
a top end;
a bottom end opposing said top end;
an elongated mid-section connecting said top end and said bottom end together and having an outside surface;
at least one longitudinal sensor cavity extending through at least one of said top end and said bottom end of the sensor body and including an inner wall; and
a window corresponding to each sensor cavity and extending through said sensor body from said outside surface of said elongated mid-section to said corresponding sensor cavity; and
a sensor assembly disposed in each sensor cavity, wherein each sensor assembly includes:
a scintillation crystal assembly, comprising:
an inner crystal housing; and
a scintillation crystal contained by said housing; and
a photomultiplier tube associated with said scintillation crystal assembly;
at least one spatial positioning device attached to said sensor body, wherein each sensor assembly is disposed in said corresponding sensor cavity such that said scintillation crystal is positioned in said sensor cavity in front of said corresponding window; and
a cylindrical outer sheath, wherein said outer sheath extends around and contains said sensor units and said spatial positioning device, wherein each window faces said outer sheath, and wherein each sensor unit is positioned within said outer sheath one on top of the other.

* * * * *